(12) United States Patent
Van Ryzin et al.

(10) Patent No.: US 6,446,080 B1
(45) Date of Patent: Sep. 3, 2002

(54) METHOD FOR CREATING, MODIFYING, AND PLAYING A CUSTOM PLAYLIST, SAVED AS A VIRTUAL CD, TO BE PLAYED BY A DIGITAL AUDIO/VISUAL ACTUATOR DEVICE

(75) Inventors: John M. Van Ryzin, Madison; Peter Douma, Wyckoff, both of NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/074,683

(22) Filed: May 8, 1998

(51) Int. Cl.[7] .............................................. G06F 17/30
(52) U.S. Cl. ..................... 707/104; 707/10; 707/102; 345/346; 345/352; 369/29; 369/30; 709/219
(58) Field of Search ............................. 707/200, 102, 707/104, 10; 369/27, 29, 30, 32; 345/146, 339, 346, 352; 709/219

(56) References Cited

U.S. PATENT DOCUMENTS

| | | | |
|---|---|---|---|
| 4,817,203 A | | 3/1989 | Tsurumoto et al. ......... 455/603 |
| 4,999,622 A | | 3/1991 | Amano et al. |
| 5,363,355 A | | 11/1994 | Takagi ........................ 369/32 |
| 5,420,573 A | | 5/1995 | Tanaka et al. .......... 340/825.24 |
| 5,488,357 A | | 1/1996 | Sato et al. ............. 340/825.25 |
| 5,592,511 A | * | 1/1997 | Schoen et al. .............. 375/220 |
| 5,594,709 A | | 1/1997 | Nagano et al. ............... 369/32 |
| 5,633,839 A | * | 5/1997 | Alexander et al. ............ 369/30 |
| 5,646,608 A | | 7/1997 | Shintani ................ 340/825.25 |
| 5,740,134 A | * | 4/1998 | Peterson ...................... 369/30 |
| 5,751,672 A | * | 5/1998 | Yankowski ................... 369/30 |
| 5,793,366 A | * | 8/1998 | Mano et al. ................. 345/329 |
| 5,815,471 A | * | 9/1998 | Mince et al. ................. 369/30 |
| 5,864,868 A | * | 1/1999 | Contois ...................... 707/104 |
| 5,900,830 A | * | 5/1999 | Scheffler .................... 341/123 |
| 5,925,843 A | * | 7/1999 | Miller et al. .................. 84/609 |
| 5,949,688 A | * | 9/1999 | Montoya et al. ............. 700/235 |
| 5,974,004 A | * | 10/1999 | Dockes et al. ................. 369/30 |
| 5,990,884 A | * | 11/1999 | Douma et al. .............. 345/327 |
| 6,026,062 A | * | 2/2000 | Johnson ....................... 369/33 |

FOREIGN PATENT DOCUMENTS

WO    WO 98/47080    * 10/1998

OTHER PUBLICATIONS

McCandless, M., "The MP3 revolution", IEEE Intelligent Systems, vol. 14, No. 3, May 2000, Abstract Only.*
Breen, C. "Steal this song", MacWorld, vol. 17, No. 8, Aug. 2000, Abstract Only.*

* cited by examiner

Primary Examiner—Jean R. Homere
(74) Attorney, Agent, or Firm—Harold T. Fujii

(57) ABSTRACT

A custom playlist to be played by a digital audio/visual actuator device may be easily created and modified through use of an effective human interface on an external device, such as a personal computer. Tracks, easily identifiable by their track index identifier and the TOC of the digital storage device on which they are stored, are selected by the user or by an automated method and added to a playlist file. Once the playlist is created, the playlist file is stored to non-volatile memory of the digital audio/visual actuator device. The playlist may then be easily modified if so desired by performing such functions as adding tracks, deleting tracks, and rearranging tracks of the playlist through the interface of the external device. The playlist may be played by the digital audio/visual actuator device at any time after it has been created and the digital audio/visual actuator device may be controlled by a remote control unit to actuate the playlist if so desired.

23 Claims, 11 Drawing Sheets

METHOD FOR CREATING, MODIFYING, AND PLAYING A CUSTOM PLAYLIST, SAVED AS A VIRTUAL CD, TO BE PLAYED BY A DIGITAL AUDIO/VISUAL ACTUATOR DEVICE

CROSS REFERENCE TO RELATED APPLICATIONS

The subject matter of the present application is related to copending U.S. application Ser. No. 09/074,681, filed contemporaneously with this application and assigned to Sony Corporation and to Sony Electronics, which is expressly incorporated herein by reference.

FIELD OF THE INVENTION

This invention relates generally to digital audio/visual actuation devices, and more particularly to an improved method for creating, modifying, and playing a customized playlist that may be utilized by such digital audio/visual actuation devices at any later time.

BACKGROUND OF THE INVENTION

A problem commonly encountered with digital audio/visual actuation devices capable of playing two or more "tracks", or collections of information, in a consecutive manner is how to play tracks in an order other than the order in which the tracks are normally to be played, as usually dictated by the order in which the tracks are stored on a digital storage device such as a compact disc (CD). This concern is addressed by creating "playlists" to be played by the digital audio/visual actuator device that may be customized to the tastes and needs of the individual user. The tracks that comprise the playlist may be songs or other audio clips, video clips, or audio/visual clips and are typically identified by the table of contents (TOC), a database containing such information as the number of tracks and length of each track. Digital audio/visual actuator devices include, but are not limited to, optical actuator devices, video actuator devices, audio actuator devices, or combinations thereof, such as, for instance, boomboxes. Examples of such digital audio/visual actuator devices include the compact disc (CD) player, the digital audio tape (DAT) player, the cassette recorder, the digital visual disc/mini disc (DVD/MD) player, and other audio/visual equipment.

Consider, as an example, the creation of a playlist for a CD player. As is known in the art, the CD player function may be fulfilled by a CD player having no other function or by audio/visual (AN) equipment having a compact disc player function, as well as other AN functions. The user of a CD player may create a customized playlist that selects tracks to be played in an order different from their chronological order on a CD. This may include, in the case of a single CD, rearranging the order in which tracks of the CD are played and additionally, in the case of a multiple CD player capable of housing multiple CDs simultaneously, selecting tracks from the multiple CDs in an order other than the order in which the tracks are stored on the CD and also in an order that is not bound by the position of one CD vis-a-vis another CD. The user of the CD player may accordingly create a customized playlist that lists CD tracks in the order in which the user would like to hear them played regardless of the order in which they are stored on one or more CDs housed in the CD player.

CD players may possess the means for the user to create a custom playlist. Typically, however, CD players, as is the case with other digital audio/visual actuator devices, offer an extremely weak and cumbersome human interface for this task. The user must rely on the front panel controls of the CD player itself to create a playlist. The front panel controls of a CD player are awkward and counterintuitive to use, especially when one considers that they typically have multiple functions that cannot be dedicated just to the task of creating a playlist. As a result, keys on the front panel of the CD player may not dedicated to the playlist creation function and thus may be counterintuitive to use for this purpose. Exacerbating this awkwardness is the fact that keys to be used for creating a playlist may not even have alpha-numeric properties.

A further difficulty with utilizing a custom playlist is that the created playlist is itself stored in volatile memory of the digital audio/visual actuator device and not in a permanent digital storage device such as a CD. Because the playlist is stored in volatile memory, it is lost whenever power to the CD player is lost, whether by turning off the digital audio/visual actuator device or accidentally losing power. The playlist must therefore be recreated every time power is lost to the digital audio/visual actuator device. Moreover, storing the created playlist in the volatile memory of the digital audio/visual actuator device requires that the playlist must be actuated by the digital audio/visual actuator device itself and not by a more convenient means, such as a remote control unit.

In light of the above discussion, it is clear that there exists a need in the art for several improvements over the prior art way of creating a customized playlist to be played by a digital audio/visual actuator device. First, there is a need to be able to overcome the problems associated with the typically weak and cumbersome human interface required to create a customized playlist on a digital audio/visual actuator device so that the user may easily and readily create the customized playlist. Second, there is a need to be able to create a customized playlist that is permanently available to the user, unlike the prior art playlist that is stored in volatile memory. Third, there is a need in the art to be able to actuate the customized playlist by means, such as a remote control unit, other than the digital audio/visual actuator device.

SUMMARY OF THE INVENTION

It is accordingly an object of the invention to create a customized playlist to be played by a digital audio/visual actuator device.

It is further an object of the invention to be able to easily create the customized playlist to be played by a digital audio/visual actuator device, thereby overcoming the problems associated with the weak human interface required by the prior art to create a playlist.

It is yet another object of the invention to create a customized playlist for a digital audio/visual actuator device that is permanently available to the user, unlike the prior art in which the playlist is stored in volatile memory.

It is still yet another object of the invention to create a customized playlist to be played by a digital audio/visual actuator device that may be actuated by means other than by the digital audio/visual actuator device, such as by a remote control unit.

Therefore, according to the present invention, a custom playlist capable of being played by a digital audio/visual actuator device may be easily created and modified by an external device that uses a user interface, such as a graphical user interface, characterized as being user-friendly. Alternately, the software of the digital audio/visual actuator device can create and modify the custom playlist with a minimum of user intervention required. The custom playlist is created by adding one or more desired tracks to a custom playlist file that is then saved in non-volatile memory of the digital audio/user actuator device.

Once the playlist is created, it may then be easily modified if so desired at any future time by performing such functions as adding tracks, deleting tracks, and rearranging tracks of the playlist through the external device. Again, these functions may be performed by the user through the interface of the external device or by software resident on the digital audio/visual actuator device. Following any modification of the playlist, it is again saved to non-volatile memory of the digital audio/visual actuator device. The playlist may be played by the digital audio/visual actuator device at any time after it has been created and saved. According to an aspect of the present invention, the digital audio/visual actuator device may also play the playlist upon receipt of appropriate commands from a remote control unit in communication with the digital audio/visual actuator device.

BRIEF DESCRIPTION OF THE DRAWINGS

The novel features believed characteristic of the invention are set forth in the claims The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention creates a playlist, a collection of information tracks capable of being played on a digital audio/visual actuator device, on a device external to the digital audio/visual actuator device. The entire playlist or individual tracks of the playlist may be downloaded from the external device to the digital audio/visual actuator device which can then play the created playlist immediately or at some future time. The tracks that comprise the playlist may be songs or other audio clips, video clips, or audio/visual clips. Digital audio/visual actuator devices include, but are not limited to, optical actuator devices, video actuator devices, audio actuator devices, or combinations thereof, such as, for instance, boomboxes. Examples of such digital audio/visual actuator devices include the CD player, the digital audio tape (DAT) player, the cassette recorder, the digital visual disc/mini disc (DVD/MD) player, and other audio/visual equipment.

The playlist is created on an external device, typically a personal computer (PC), and then is downloaded from the external device to the digital audio/visual actuator device for use at some later time. The external device communicates the playlist to the digital audio/visual actuator device by downloading the playlist file from the external device to the CD player via a connection between the two, such as by a physical cable, a radio frequency (RF) or wireless connection, or an infa-red (IR) connection. The digital audio/visual actuator device has storage capability sufficient to receive and permanently store the playlist file for later use. The software on the digital audio/visual actuator device is enhanced, if necessary, so that it is capable of accepting one or more playlists, storing and playing them as if they were playlists of actual digital storage devices, such as CDs. Once the playlist is stored, it may be played by the digital audio/visual actuator device at any time as if it were a playlist of an actual digital storage device. Unlike the prior art, the playlist file is not stored in volatile memory, so that even after turning off the digital audio/visual actuator device or otherwise losing power the playlist file is available for selection or modification. Playlists may therefore be later modified as desired.

Figure 1:
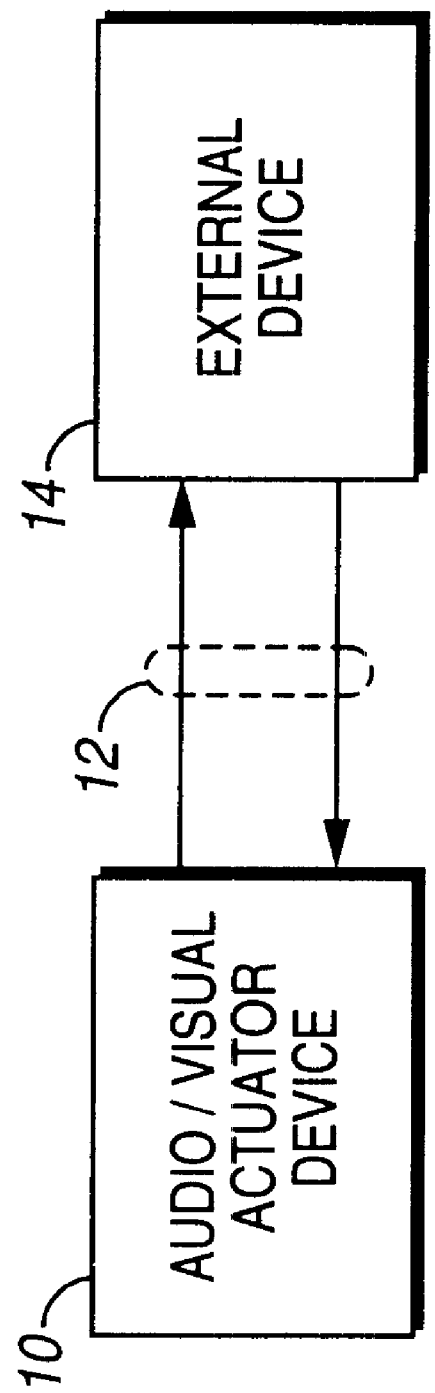
FIG. 1 is a block diagram of communications between an audio/visual actuator device and an external device, according to the present invention.
Figure 2:
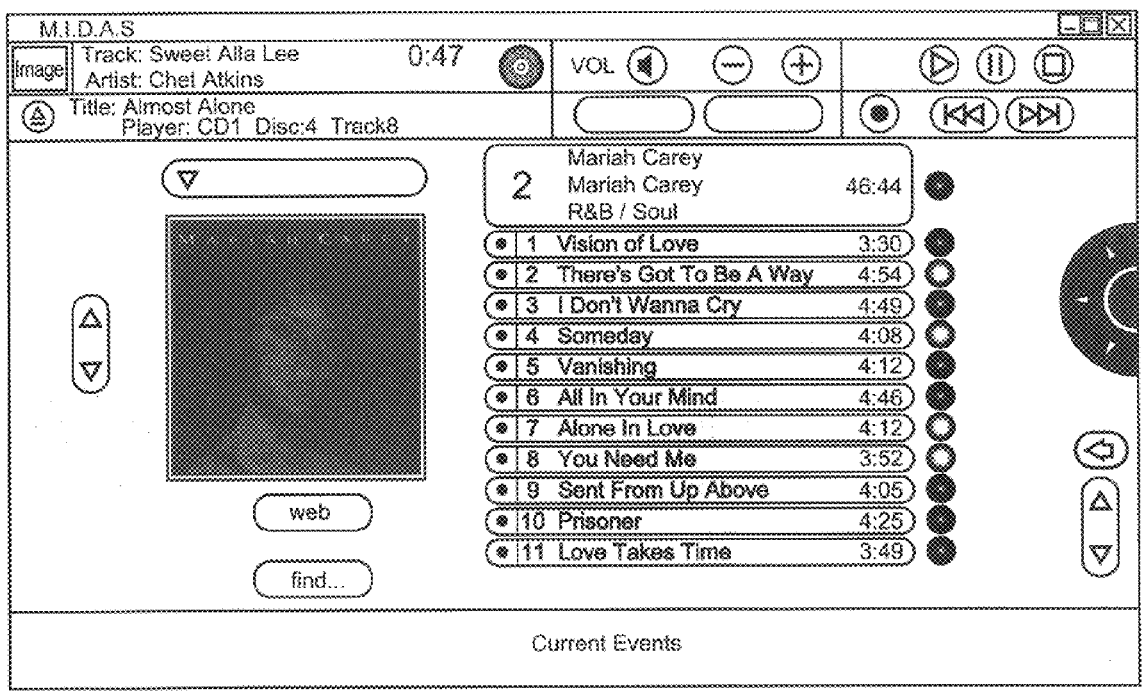
FIG. 2 is an example of a table of contents (TOC) database, as it might appear on a GUI of a PC, according to the present invention.

Referring to FIG. 1, a block diagram of communications between an audio/visual actuator device 10 and an external device 14, such as a PC, according to the present invention, is shown. Audio/visual actuator device 10 is capable of playing a custom playlist to be created on the external device 14. Two-way communications between audio/visual actuator device 10 and external device 14 are accomplished by a two-way communications link 12 which may be a physical cable, a radio frequency (RF) or wireless connection, or an infa-red (IR) connection. The two-way communications link between audio/visual actuator device 10 and external device 14 facilitates creation of the custom playlist. Information about the tracks that may be added or deleted from the playlist, such as the table of contents (TOC) database containing information such as the number of tracks and length of each track, is provided to external device 14 from audio/visual actuator device 10. An example of the TOC database, as it might appear on a GUI of a PC, is illustrated in FIG. 2. Once the playlist is created or modified, it is downloaded by external device 14 to audio/visual actuator 10.

Figure 3:
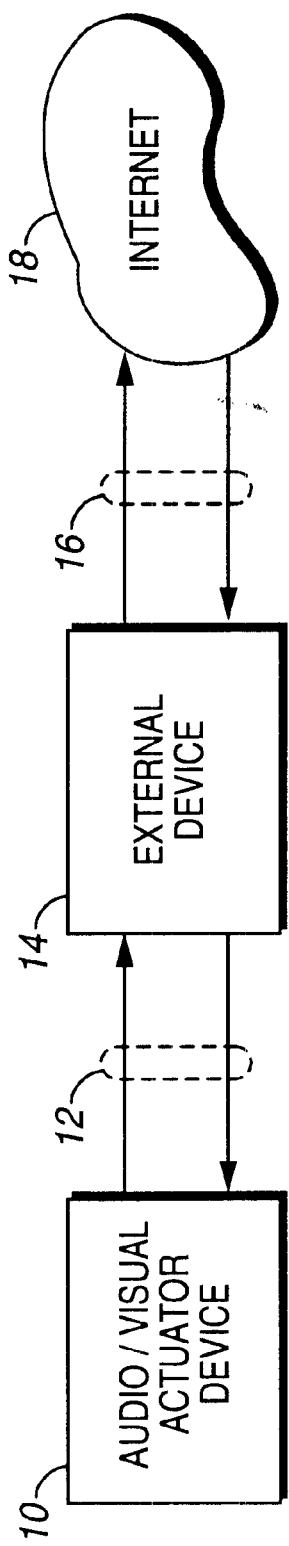
FIG. 3 is a block diagram of communications between an audio/visual actuator device, an external device, and the Internet, according to the present invention.
Figure 4:
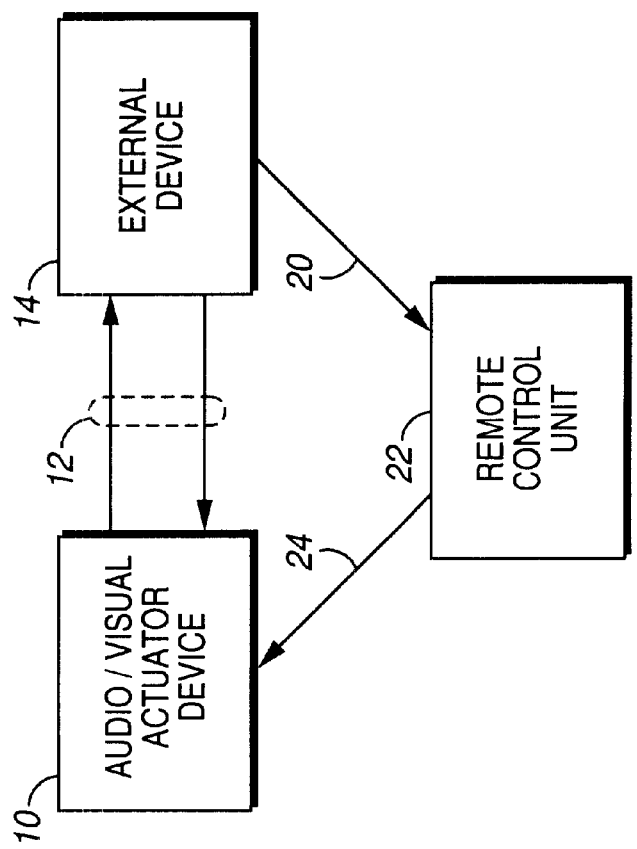
FIG. 4 is a block diagram of communications between an audio/visual actuator device, an external device, and a remote control unit, according to the present invention.

Referring to FIG. 3, it will be noted that external device 14 may also receive information pertinent to creating or modifying the playlist from external information sources 18, such as the Internet or world wide web, over two-way communications link 16. For instance, music CDs are now available over the Internet and tracks from such CDs may be added to the custom playlist to be played by audio/visual actuator device 10. It should be further noted that, as shown in FIG. 4, external device 14 may download the custom playlist to remote control unit 22 via communications link 20 in addition to downloading the playlist to audio/visual actuator device 10. In this way, it is possible for remote control unit 22 to control audio/visual actuator device 10 by sending to it appropriate control commands concerning playing the playlist.

Figure 5:
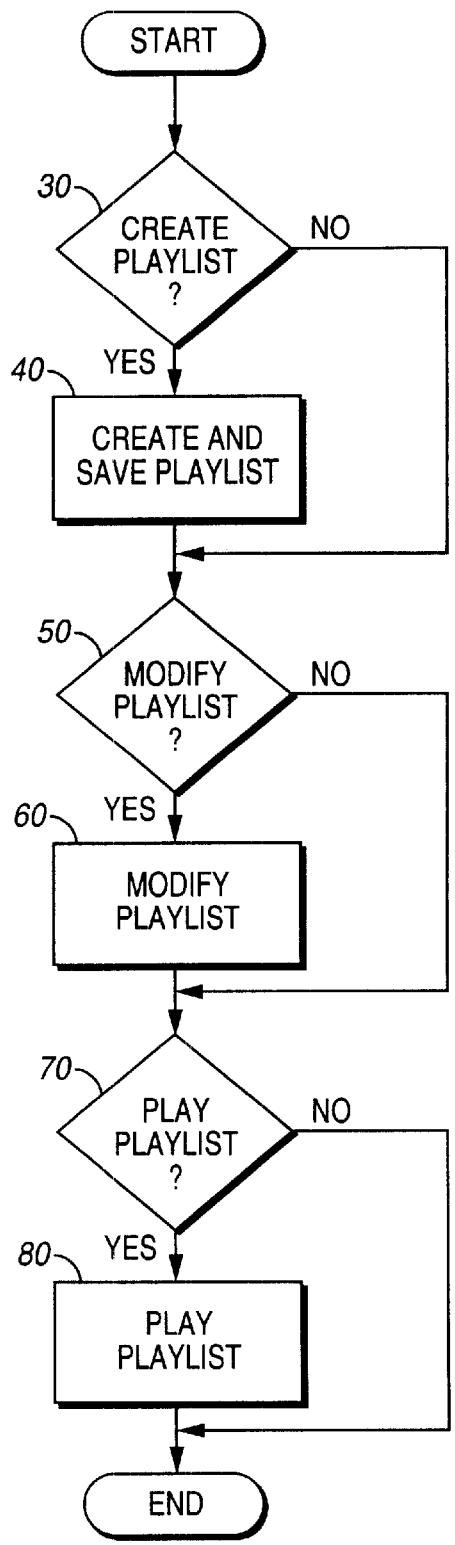
FIG. 5 is a flow chart of the steps for creating, modifying and playing a custom playlist, according to the present invention.

FIG. 5 is a flowchart that illustrates the steps for creating, playing and modifying a custom playlist, according to the present invention. Decision Block 30 inquires as to whether the user desires to create a custom playlist using the present invention. If the response is yes, then a custom playlist is created on external device 14 and saved to non-volatile memory in the digital audio/visual actuator device 10 at Block 40. If the response is no, the flow proceeds to Decision Block 50. At Decision Block 50, the user must decide whether the playlist that has been created and saved is to be modified. If the playlist is to be modified, then, at Block 60, the playlist is modified and again saved. Next, at Decision Block 70, the user must decide whether to play the playlist. The playlist is played at Block 80 or the flow terminates if the playlist is not to be played.

Figure 6:
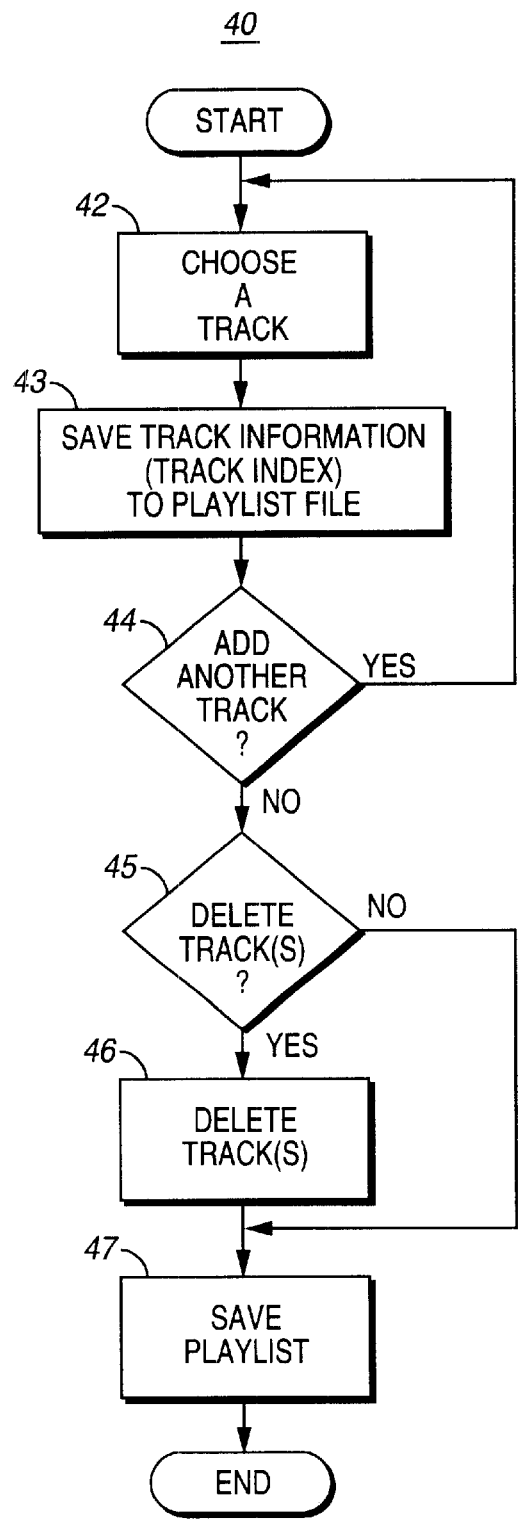
FIG. 6 is a flow chart of the steps for creating and saving a custom playlist, according to the present invention.
Figure 7A:
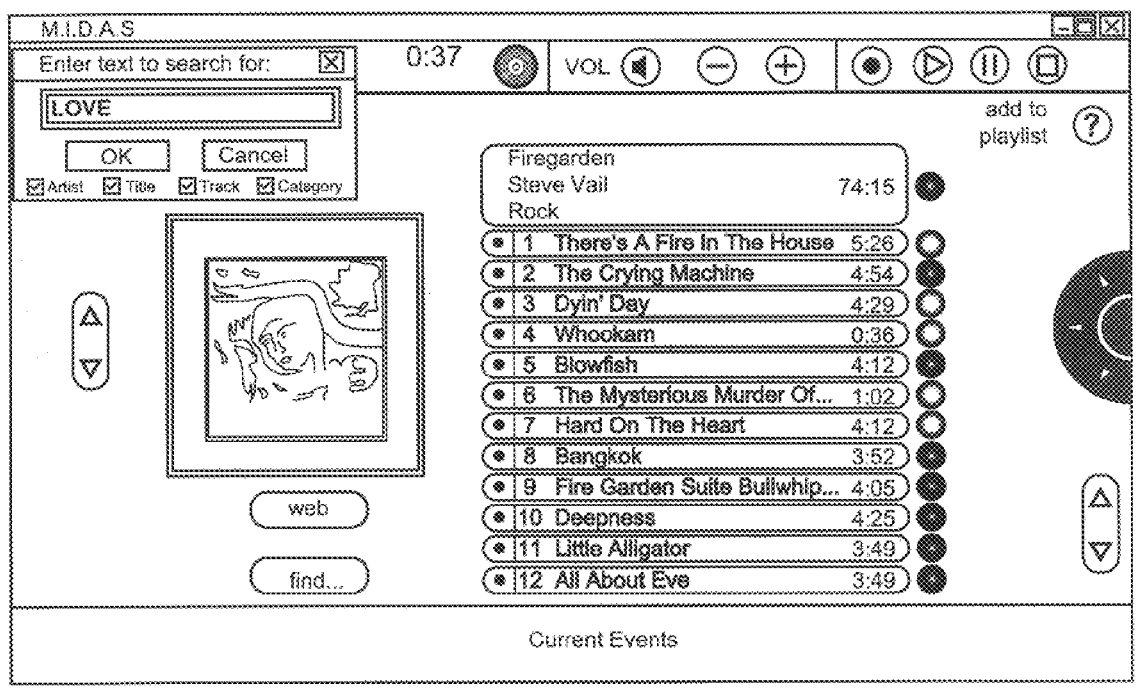
FIGS. 7a and 7b are GUI representations of a searching operation that may be performed to limit the number of tracks from which the playlist is to be created, according to the present invention.
Figure 7B:
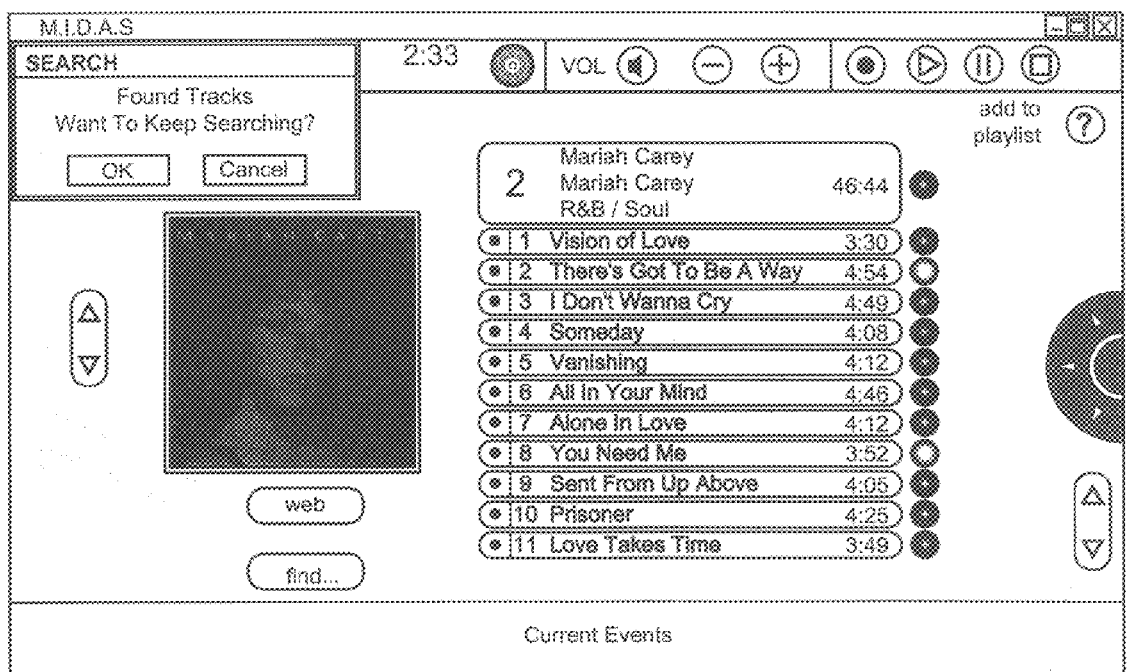

Creation of the playlist 40 will now be described. Referring to FIG. 6, at Block 42 the user chooses a track to be added to the playlist file that will be saved by the digital audio/visual actuator device. Selection of tracks to be added to the playlist may be accomplished in any number of ways. For instance, the user may choose to limit the number of tracks from which the playlist may be created by limiting the number of available tracks to those sung by a certain artist, i.e. "Elvis", or those having a title that contains the certain term, i.e. "love". This step is illustrated in the GUI representations of FIGS. 7a and 7b in which the word "love" is searched for in the title of various tracks available to be added to the playlist. Identifying information about this track, such as the track index from the TOC of the digital storage device on which the track is stored, that is capable of identifying the track is saved to the playlist file at Block 43. Next, the user must decide whether another track is to be added to the playlist at Decision Block 44. If another track is to be added to the playlist, the flow returns to Block 42. If, however, another track is not to be added to the playlist the flow continues to Decision Block 45. At Decision Block 45, the user is given the opportunity to delete any tracks added to the playlist that the user wishes to now delete from it. This is accomplished at Block 46. If no tracks are to be deleted from the playlist, the flow proceeds to Block 47. At Block 47, the playlist is saved in non-volatile memory in digital audio/visual actuator device 10.

Alternately, the playlist may be created with little user intervention at all. The digital audio/visual actuator device can be programmed to recognize those tracks that are played the most frequently and to create the custom playlist to include them. For instance, the digital audio/visual actuator device can choose the ten tracks that the user has played the most within a given time period, such as within the last week. The digital audio/visual actuator device may further have a select button on its control panel that the user may press to add a track that is being played to the playlist. Additionally, the playlist may be created by a shuffle operation that simply shuffles in random order a number of tracks. The shuffle operation may be accomplished using a random number generator, for instance, in the manner known in the art.

The custom playlist may be modified, or edited, in any number of ways. Referring back to FIG. 5, after the playlist is created and saved the user may modify the playlist before it is played, as shown at Blocks 50 and 60. As with creation of the playlist, modification of the playlist is performed by the external device 14. The external device 14 has a human interface that is much more conducive to this operation than is the control panel of digital audio/visual actuator device 10. The playlist may be edited by deleting tracks from it, rearranging the tracks, or adding tracks to it. Rearranging the tracks may be accomplished by a shuffle operation, previously discussed. It is understood that modification of the playlist may also occur after the playlist is played.

Figure 8:
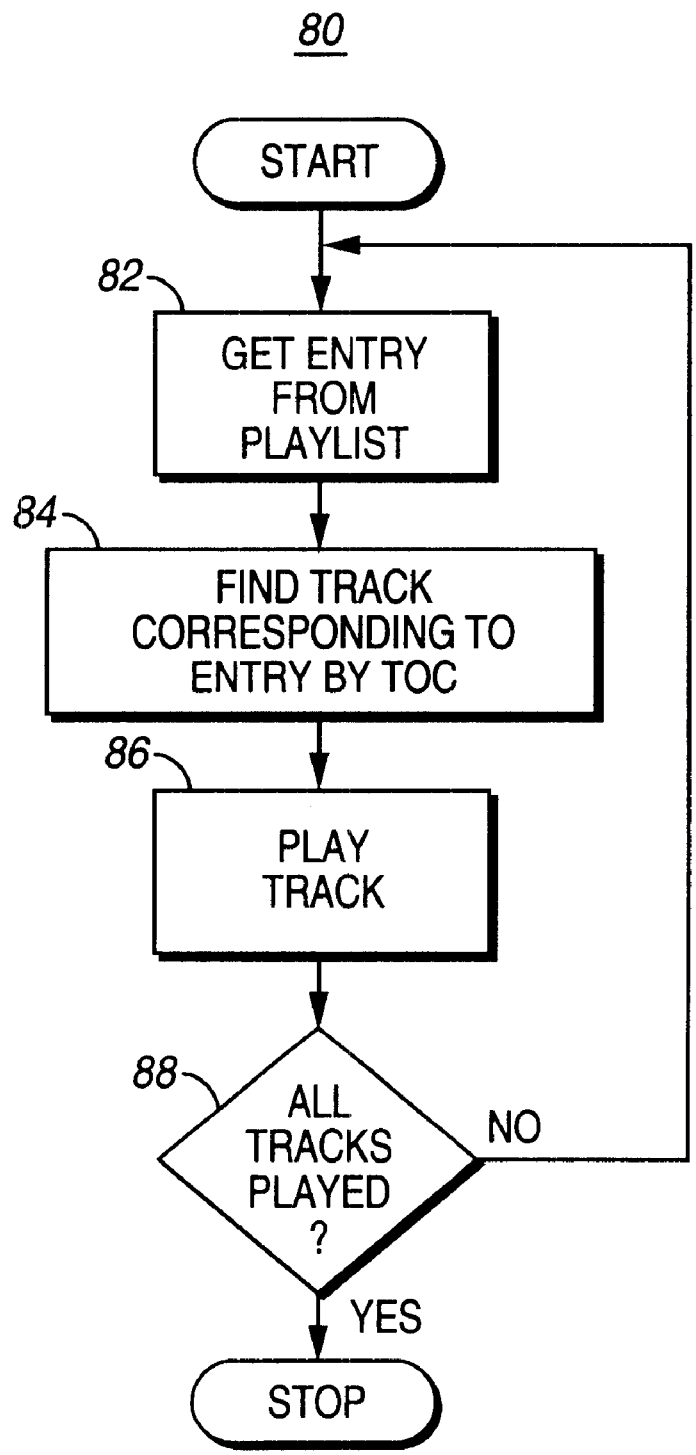
FIG. 8 is a flow chart of the steps for playing a custom playlist, according to the present invention.

After the playlist has been created, modified, if so desired, and stored to the digital audio/visual actuator device, it may be played at any time in the future by the digital audio/visual actuator device 10. Because the playlist has been saved to non-volatile memory of the digital audio/visual actuator device, unlike the prior art, the user need not worry about the playlist being lost. Referring now to FIG. 8, the steps of Block 80 for playing the playlist are shown. First, at Block 82, the entry of the next track to be played is obtained from the playlist stored in digital audio/visual actuator device 10. The track is found by the TOC and track index unique to it, as shown at Block 84. Next, at Block 86, the track is played by digital audio/visual actuator device 10. At Decision Block 88, if not all tracks of the playlist have been played, the flow is returned to Block 82. If, however, all tracks of the playlist have been played, the flow is terminated. The above steps for playing the playlist will typically be handled by digital audio/visual actuator device 10 with no user intervention required.

Figure 9:
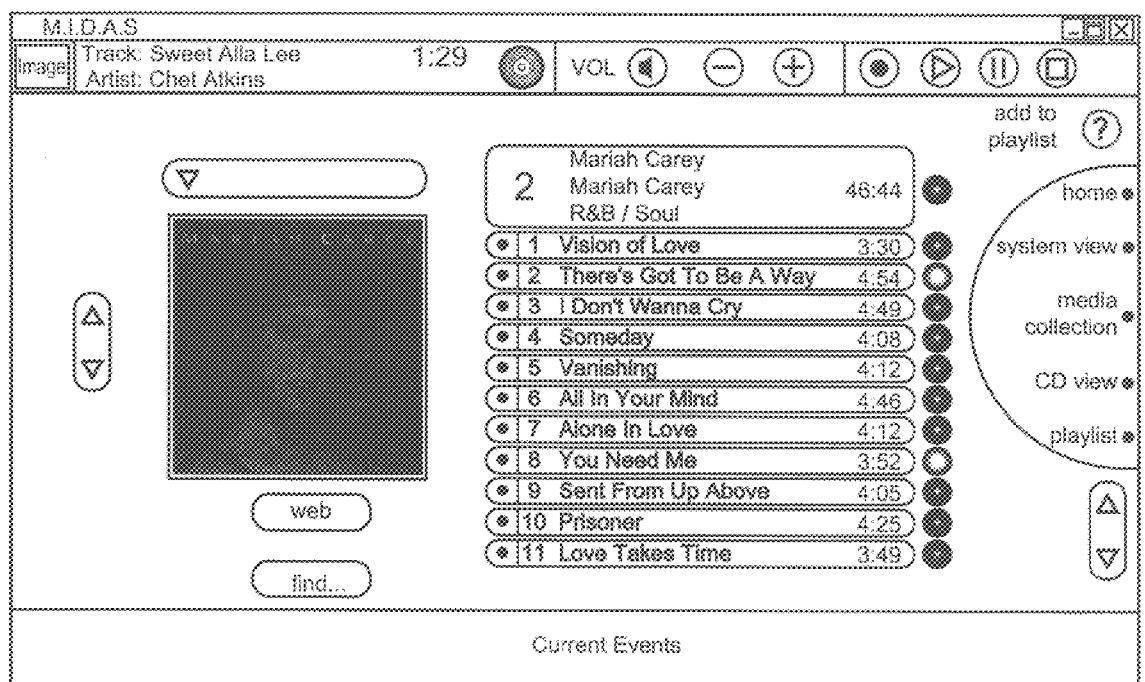
FIG. 9 is a GUI representation of the playlist icon, according to the present invention.

The following example, in which it is assumed that the digital audio/visual actuator device is a CD player and the external device is a PC, illustrates operation of the present invention. The external device is capable of collecting and managing information about many different CDs that may be contained in the CD player. Playlists are created on a PC, for instance, by pointing and clicking on icons of a graphical user interface (GUI) that are representative of desired CD tracks, thereby selecting those tracks to be added to the playlist. FIG. 9 provides an example of what the GUI on a PC might look like; in FIG. 9, on the right side of the screen, the icon for selecting the playlist function is clearly shown. Tracks are easily identified by their track index in the TOC of a CD, a database containing the number of tracks and length of each track on the CD. The reader is referred again to FIG. 2 which shows a GUI example of a TOC of a music CD, by way of example. Using the TOC and track index, it is possible to place a certain track of a CD in any position of the custom playlist being created.

Once the playlist has been created, the PC communicates the playlist to the CD player by downloading the playlist file from the external device PC to the CD player via a physical cable, a radio frequency (RF) or wireless connection, or an infa-red (IR) connection. For instance, the PC can communicate via an RS232 port connected to an interface device capable of facilitating communications between two serial devices, such as a PC VISION TOUCH box that uses an Al protocol or an S-Link protocol standard. The CD player contains storage capability, such as a random access memory (RAM), and a central processing unit (CPU) so that the playlist may be received and permanently stored for later use. The software on the CD player is enhanced to accept one or more playlists, store them and play them just as if they were virtual CDs. Once the playlist is stored, it may be played by the CD player at any time as if it were a virtual CD. Alternatively, the external device, such as a PC, could be used to command the CD player to play a certain track, one at a time.

Figure 10:
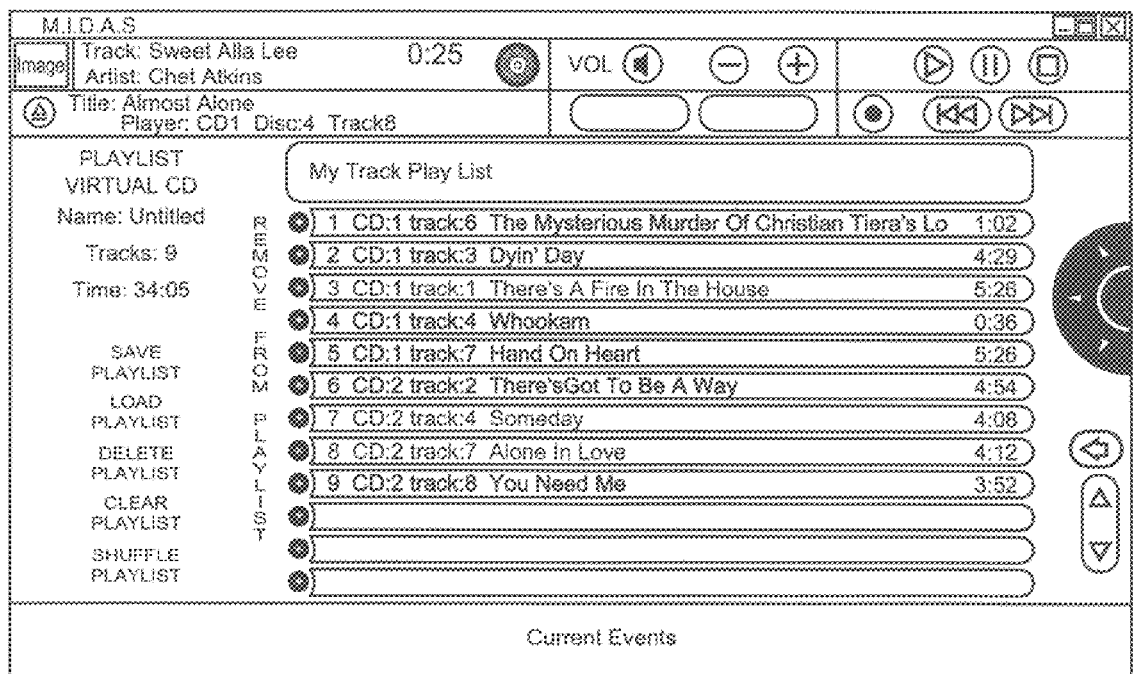
FIG. 10 is a GUI representation of various options available for modifying the playlist, according to the present invention.

As previously discussed, the custom playlist may be modified in a variety of ways. Modification of the playlist is performed by external device 14 and may include deleting tracks from the playlist, rearranging tracks in the playlist, and adding tracks to the playlist. Referring to FIG. 10, a sample GUI illustrates the various options for modifying the playlist, including saving, loading, deleting, clearing, or shuffling the playlist.

An important feature of the present invention is the ease with which a customized playlist may be created, modified and played. The external device, such as a PC or other similar device, is used to manage the CD collection in the CD player so that the tracks of each CD in the CD player is known. Thus, the external device knows, at any given time, the location of each track on a CD in the CD player. A graphical user interface (GUI) of the external device, such as a PC GUI, provides for the creation, modification, and selection of a customized playlist to be made with simplistic ease. This is quite different from the prior art approach that does not use a GUI but instead relies on the front panel controls of the CD player which are typically counter-intuitive and awkward to use, as noted above. The present invention is especially useful when creating a recording of information contained within a digital storage device of a first digital audio/visual actuator device to a second digital audio/visual actuator device. An example of this would be to use a CD player to record songs from a playlist of music CDs to a mini disk (MD) player or a cassette tape recorder.

While the invention has been particularly shown and described with reference to a preferred embodiment, it will be understood by those skilled in the art that various changes in form and detail may be made therein without departing from the spirit and scope of the invention.

What is claimed is:

1. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device.

2. The method of claim 1, wherein creating the custom playlist comprises the steps of:

obtaining information about a plurality of tracks that are available to be added to the custom playlist;

selecting one or more tracks of the plurality of tracks to be added to the custom playlist;

adding the one or more tracks to the custom playlist by saving an identifier of each track of the one or more tracks to a playlist file; and saving the playlist file.

3. The method of claim 2, wherein the step of obtaining information about the plurality of tracks comprises the external device receiving information about the plurality of tracks from the digital audio/visual actuator device.

4. The method of claim 3, wherein the external device receives information about the plurality of tracks from a digital storage device in the digital audio/visual actuator device.

5. The method of claim 2, wherein the step of obtaining information about the plurality of tracks comprises the external device receiving information about the plurality of tracks from an external information source having a two-way communications link with the external device.

6. The method of claim 5, wherein the external information source is the Internet.

7. The method of claim 2, wherein the step of selecting the one or more tracks to be added to the custom playlist comprises searching the plurality of tracks for a characteristic.

8. The method of claim 2, wherein the identifier is a track index of the track.

9. The method of claim 2, wherein prior to saving the playlist file, comprising the additional step of:

deleting any track of the custom playlist that is no longer to be in the custom playlist.

10. The method of claim 1, wherein the communications link is a cable.

11. The method of claim 1, wherein the communications link is a wireless connection.

12. The method of claim 1, wherein the communications link is an infa-red connection.

13. The method of claim 1, wherein the communications link is a two-way communications link.

14. The method of claim 1, wherein after saving the custom playlist comprising the further step of:

modifying the custom playlist to create a modified custom playlist.

15. The method of claim 14, wherein after modifying the custom playlist comprising the further step of:

saving the modified custom playlist.

16. The method of claim 1, wherein after saving the custom playlist comprising the further step of:

playing the custom playlist on the digital audio/visual actuator device.

17. The method of claim 16, wherein the step of playing the custom playlist is actuated by a remote control device in communication with the digital audio/visual actuator device.

18. The method of claim 16, wherein playing the custom playlist comprises the steps of:

a. obtaining an entry from the custom playlist that corresponds to a track of the custom playlist to be played;

b. identifying the track by the entry from the custom playlist;

c. playing the track on the digital audio/visual actuator device; and d. repeating steps a-c above for each track of the custom playlist until each track of the custom playlist is played.

19. The method of claim 1, wherein after providing the custom playlist to the digital audio/visual actuator device comprising the further step of:

playing the custom playlist on the digital audio/visual actuator device.

20. The method of claim 19, wherein the step of playing the custom playlist is actuated by a remote control device in communication with the digital audio/visual actuator device.

21. The method of claim 19, wherein playing the custom playlist comprises the steps of:

a. obtaining an entry from the custom playlist that corresponds to a track of the custom playlist to be played;

b. identifying the track by the entry from the custom playlist;

c. playing the track on the digital audio/visual actuator device;

d. repeating steps a–c above for each track of the custom playlist until each track of the custom playlist is played.

22. The method of claim 1, wherein after creating the custom playlist on an external device, comprising the further step of:

modifying the custom playlist to create a modified custom playlist.

23. The method of claim 22, wherein after modifying the custom playlist comprising the further step of:

saving the modified custom playlist.

* * * * *

(12) EX PARTE REEXAMINATION CERTIFICATE (10720th)

United States Patent
Van Ryzin et al.

(10) Number: US 6,446,080 C1
(45) Certificate Issued: Sep. 25, 2015

(54) METHOD FOR CREATING, MODIFYING, AND PLAYING A CUSTOM PLAYLIST, SAVED AS A VIRTUAL CD, TO BE PLAYED BY A DIGITAL AUDIO/VISUAL ACTUATOR DEVICE

(75) Inventors: John M. Van Ryzin, Madison, NJ (US); Peter Douma, Wyckoff, NJ (US)

(73) Assignee: MOBILEMEDIA IDEAS LLC, Chevy Chase, MD (US)

Reexamination Request:
No. 90/011,640, Apr. 12, 2011

Reexamination Certificate for:
Patent No.: 6,446,080
Issued: Sep. 3, 2002
Appl. No.: 09/074,683
Filed: May 8, 1998

(51) Int. Cl.
*G06F 17/30* (2006.01)
(52) U.S. Cl.
CPC ................ *G06F 17/30286* (2013.01)
(58) Field of Classification Search
USPC ......................................... 707/104
See application file for complete search history.

(56) References Cited

To view the complete listing of prior art documents cited during the proceeding for Reexamination Control Number 90/011,640, please refer to the USPTO's public Patent Application Information Retrieval (PAIR) system under the Display References tab.

*Primary Examiner* — Dennis Bonshock

(57) ABSTRACT

A custom playlist to be played by a digital audio/visual actuator device may be easily created and modified through use of an effective human interface on an external device, such as a personal computer. Tracks, easily identifiable by their track index identifier and the TOC of the digital storage device on which they are stored, are selected by the user or by an automated method and added to a playlist file. Once the playlist is created, the playlist file is stored to non-volatile memory of the digital audio/visual actuator device. The playlist may then be easily modified if so desired by performing such functions as adding tracks, deleting tracks, and rearranging tracks of the playlist through the interface of the external device. The playlist may be played by the digital audio/visual actuator device at any time after it has been created and the digital audio/visual actuator device may be controlled by a remote control unit to actuate the playlist if so desired.

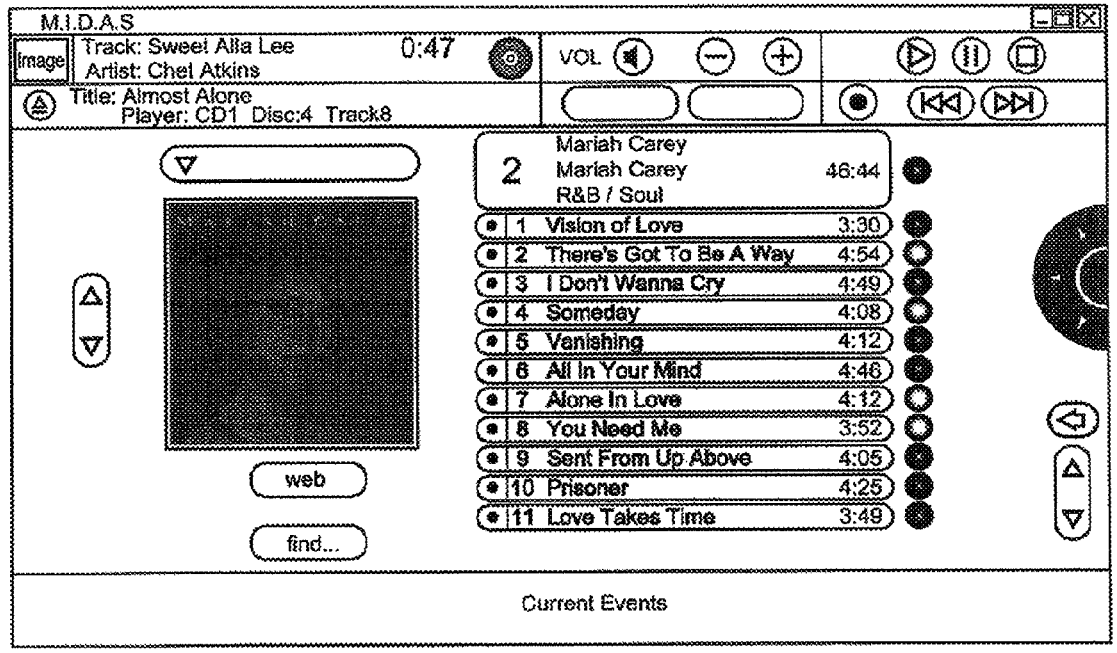

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-23 are cancelled.

New claims 24-37 are added and determined to be patentable.

*24. A method for generating a custom playlist in a non-volatile memory of a digital audio/visual actuator device, said playlist suitable to be played by the digital audio/visual actuator device, comprising the steps of:*
  *creating the custom playlist on an external device with a graphical user interface;*
  *transferring the custom playlist to the digital audio/visual actuator device by downloading a playlist file that contains the custom playlist from the external device to the digital audio/visual actuator device over a communications link between the external device and the digital audio/visual actuator device;*
  *saving the custom playlist in said non-volatile memory of the digital audio/visual actuator device,*
  *creating another custom playlist on the external device with a graphical user interface;*
  *transferring the other custom playlist to the digital audio/visual actuator device by downloading another playlist file that contains the other custom playlist from the external device to the digital audio/visual actuator device over a communications link between the external device and the digital audio/visual actuator device; and*
  *saving the other custom playlist as well as the first-mentioned custom playlist in said non-volatile memory of the digital audio/visual actuator device,*
  *wherein the step of creating the first-mentioned custom playlist comprises the step of recognizing those tracks played most frequently and including them in the first-mentioned custom playlist.*

*25. A method for generating a custom playlist in a non-volatile memory of a digital audio/visual actuator device, said playlist suitable to be played by the digital audio/visual actuator device, comprising the steps of:*
  *creating the custom playlist on an external device with a graphical user interface;*
  *transferring the custom playlist to the digital audio/visual actuator device by downloading a playlist file that contains the custom playlist from the external device to the digital audio/visual actuator device over a communications link between the external device and the digital audio/visual actuator device;*
  *saving the custom playlist in said non-volatile memory of the digital audio/visual actuator device,*
  *creating another custom playlist on the external device with a graphical user interface;*
  *transferring the other custom playlist to the digital audio/visual actuator device by downloading another playlist file that contains the other custom playlist from the external device to the digital audio/visual actuator device over a communications link between the external device and the digital audio/visual actuator device; and*
  *saving the other custom playlist as well as the first-mentioned custom playlist in said non-volatile memory of the digital audio/visual actuator device,*
  *wherein the step of creating the first mentioned custom playlist comprises the step of recognizing those tracks played most frequently within a certain time period and including them in the first-mentioned custom playlist.*

*26. A method for generating a custom playlist in a non-volatile memory of a digital audio/visual actuator device, said playlist suitable to be played by the digital audio/visual actuator device, comprising the steps of:*
  *creating the custom playlist on an external device with a graphical user interface;*
  *transferring the custom playlist to the digital audio/visual actuator device by downloading a playlist file that contains the custom playlist from the external device to the digital audio/visual actuator device over a communications link between the external device and the digital audio/visual actuator device;*
  *saving the custom playlist in said non-volatile memory of the digital audio/visual actuator device,*
  *creating another custom playlist on the external device with a graphical user interface;*
  *transferring the other custom playlist to the digital audio/visual actuator device by downloading another playlist file that contains the other custom playlist from the external device to the digital audio/visual actuator device over a communications link between the external device and the digital audio/visual actuator device; and*
  *saving the other custom playlist as well as the first-mentioned custom playlist in said non-volatile memory of the digital audio/visual actuator device,*
  *wherein the step of creating the first-mentioned custom playlist comprises the step of identifying available tracks performed by a certain artist and including them in the first-mentioned custom playlist, and*
  *wherein the step of creating the other custom playlist comprises the step of recognizing those tracks played most frequently and including them in the other custom playlist.*

*27. A method for generating a custom playlist in a non-volatile memory of a digital audio/visual actuator device, said playlist suitable to be played by the digital audio/visual actuator device, comprising the steps of:*
  *creating the custom playlist on an external device with a graphical user interface;*
  *transferring the custom playlist to the digital audio/visual actuator device by downloading a playlist file that contains the custom playlist from the external device to the digital audio/visual actuator device over a communications link between the external device and the digital audio/visual actuator device; and*
  *saving the custom playlist in said non-volatile memory of the digital audio/visual actuator device,*
  *wherein creating the custom playlist comprises the steps of:*
    *obtaining information pertaining to a track that is available to be added to the custom playlist, wherein the available track is currently not available in the digital audio/visual actuator device;*
    *adding the available track to the custom playlist by saving an identifier of the available track to a playlist file; and*
    *saving the playlist file,*
  *wherein the available track is available from the Internet.*

28. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein creating the custom playlist comprises the steps of:

obtaining information pertaining to a track that is available to be added to the custom playlist, wherein the available track is currently not available in the digital audio/visual actuator device;

adding the available track to the custom playlist by saving an identifier of the available track to a playlist file; and saving the playlist file, wherein the available track is available from the Internet over a two-way communications link.

29. The method of claim 28, comprising the further step of:

playing the custom playlist on the digital audio/visual actuator device.

30. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein creating the custom playlist comprises the steps of:

obtaining information pertaining to a track that is available to be added to the custom playlist, wherein the available track is currently not available in the digital audio/visual actuator device;

adding the available track to the custom playlist by saving an identifier of the available track to a playlist file; and saving the playlist file, further comprising the steps of:

creating another custom playlist on the external device with a graphical user interface;

transferring the other custom playlist to the digital audio/visual actuator device by downloading another playlist file that contains the other custom playlist from the external device to the digital audio/visual actuator device over a communications link between the external device and the digital audio/visual actuator device; and saving the other custom playlist as well as the first-mentioned custom playlist in said non-volatile memory of the digital audio/visual actuator device, wherein the step of creating the first-mentioned custom playlist comprises the step of recognizing those tracks played most frequently and including them in the first-mentioned custom playlist.

31. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein creating the custom playlist comprises the steps of:

obtaining information pertaining to a track that is available to be added to the custom playlist, wherein the available track is currently not available in the digital audio/visual actuator device;

adding the available track to the custom playlist by saving an identifier of the available track to a playlist file; and saving the playlist file, further comprising the steps of:

creating another custom playlist on the external device with a graphical user interface;

transferring the other custom playlist to the digital audio/visual actuator device by downloading another playlist file that contains the other custom playlist from the external device to the digital audio/visual actuator device over a communications link between the external device and the digital audio/visual actuator device; and saving the other custom playlist as well as the first-mentioned custom playlist in said non-volatile memory of the digital audio/visual actuator device, wherein the step of creating the first mentioned custom playlist comprises the step of recognizing those tracks played most frequently within a certain time period and including them in the first-mentioned custom playlist.

32. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein creating the custom playlist comprises the steps of:

obtaining information pertaining to a track that is available to be added to the custom playlist, wherein the available track is currently not available in the digital audio/visual actuator device;

adding the available track to the custom playlist by saving an identifier of the available track to a playlist file; and saving the playlist file, further comprising the steps of:

creating another custom playlist on the external device with a graphical user interface;

transferring the other custom playlist to the digital audio/visual actuator device by downloading another playlist file that contains the other custom playlist from the external device to the digital audio/visual actuator device over a communications link between the external device and the digital audio/visual actuator device; and saving the other custom playlist as well as the first-mentioned custom playlist in said non-volatile memory of the digital audio/visual actuator device, wherein the step of creating the first-mentioned custom playlist comprises the step of identifying available tracks performed by a certain artist and including them in the first-mentioned custom playlist, and wherein the step of creating the other custom playlist comprises the step of identifying those tracks played most frequently and including them in the other custom playlist.

33. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein the step of creating the custom playlist comprises the step of recognizing those tracks played most frequently and including them in the custom playlist.

34. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein the step of creating the custom playlist comprises the step of recognizing those tracks played most frequently within a certain time period and including them in the custom playlist.

35. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein the step of creating the custom playlist comprises the step of using a shuffle operation.

36. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein the step of creating the custom playlist comprises the step of using a shuffle operation using a random number operation.

37. A method for generating a custom playlist in a non-volatile memory of a digital audio/visual actuator device, said playlist suitable to be played by the digital audio/visual actuator device, comprising the steps of:

creating the custom playlist on an external device with a graphical user interface;

transferring the custom playlist to the digital audio/visual actuator device by downloading a playlist file that contains the custom playlist from the external device to the digital audio/visual actuator device over a communications link between the external device and the digital audio/visual actuator device; and saving the custom playlist in said non-volatile memory of the digital audio/visual actuator device, wherein the step of creating the custom playlist comprises the step of actuating a control structure to add a track that is currently being played to the custom playlist.

* * * * *